United States Patent
Purcell et al.

(10) Patent No.: US 7,126,604 B1
(45) Date of Patent: Oct. 24, 2006

(54) EFFICIENTLY DETERMINING STORAGE LOCATIONS FOR THE LEVELS OF DETAIL OF A MIP MAP OF AN IMAGE

(76) Inventors: Stephen Clark Purcell, 365 Preston Dr., Mountain View, CA (US) 94040; Daniel A. Kartch, 3567 Sandpebble Dr., #637, San Jose, CA (US) 95136

( * ) Notice: Subject to any disclaimer, the term of this patent is extended or adjusted under 35 U.S.C. 154(b) by 615 days.

(21) Appl. No.: 09/925,127

(22) Filed: Aug. 8, 2001

(51) Int. Cl.
*G06T 17/00* (2006.01)
(52) U.S. Cl. ............... 345/428; 345/419; 345/581; 345/543; 345/587
(58) Field of Classification Search ........... 345/552, 345/543, 428, 419, 420, 587, 581
See application file for complete search history.

(56) References Cited

U.S. PATENT DOCUMENTS

| | | | | |
|---|---|---|---|---|
| 4,692,880 A | * | 9/1987 | Merz et al. | 345/587 |
| 6,002,406 A | * | 12/1999 | Zhao | 345/581 |
| 6,429,873 B1 | * | 8/2002 | Kacevas et al. | 345/587 |
| 6,650,333 B1 | * | 11/2003 | Baldwin | 345/552 |

* cited by examiner

*Primary Examiner*—Kimbinh T. Nguyen
(74) *Attorney, Agent, or Firm*—Townsend and Townsend and Crew LLP

(57) ABSTRACT

A method, apparatus, and computer program product for determining an amount of storage for a level of detail in a MIP map. It includes identifying a given level of detail; identifying a size for an immediately larger level of detail and a magnitude for each dimension of the immediately larger level of detail; and calculating the amount of storage based on the size and magnitudes without using a multiply operation or a precomputed table of offsets.

21 Claims, 5 Drawing Sheets

EFFICIENTLY DETERMINING STORAGE LOCATIONS FOR THE LEVELS OF DETAIL OF A MIP MAP OF AN IMAGE

BACKGROUND

The present invention relates generally to computer graphics, and particularly to generating images using MIP maps.

In modern computer graphics systems, a given image may be drawn at a multitude of sizes. For example, to produce an image of a field of tulips, the system may generate an image of a tulip, and then draw the image many times to produce the field. Tulips in the foreground are drawn at a large size, while tulips in the background are drawn at a much smaller size due to their greater distance from the viewer. However, if each tulip image has the same number of pixels, the large tulips may appear blurry while the small tulips may be aliased.

In order to address these problems, and to speed generation of such a display, conventional systems employ a technique called "MIP mapping." The term MIP derives from the Latin phrase "multum in parvum" which means "many things in a small place." According to this technique, multiple versions of the tulip image are generated before rendering the image of the field of tulips. Each version is of a different size and includes an appropriate number of pixels to prevent blurring or aliasing when rendered at that size. Each version is said to be at a different MIP map level of detail (LOD). Together the versions constitute the MIP map for the tulip image.

With MIP mapping, a tulip of a certain size can be drawn by simply selecting the appropriate MIP map LOD. Each LOD is assigned a sequential number, with zero assigned to the LOD having the largest number of pixels (referred to as the "base LOD" or "base image"). Then a particular LOD can be selected by merely specifying its number. Some scaling of the selected LOD is still usually required. But because the selected LOD is close to the right size, only minimal scaling is necessary, thus reducing the time required to scale and the possibility of scaling errors.

Usually a high-resolution base image is subsampled in each dimension by a factor of 2, often all the way down to 1×1 pixels, to create the LODs. When map dimensions are powers of two, it's easy to find the beginning (and end) of a given LOD in memory given a base memory address. Otherwise, a more complex technique is required. One conventional solution is to calculate the amount of storage space for each LOD by simply multiplying the dimensions of that LOD to obtain the size of that LOD. Because the multiply is a time-consuming operation, these calculations are not performed at run time as each LOD is selected. Instead, the calculations are performed in advance to create an array of pointers. Each pointer points to the beginning memory address of one of the LODs. Then during run time, when a LOD is needed, the number of the LOD is used to index the array, which produces a pointer to the beginning address of that LOD in memory. One disadvantage of this technique is that a significant amount of memory is required simply to store the array of pointers. Another disadvantage is that significant time is required to use the array at run time.

SUMMARY

In general, in one aspect, the invention features a method, apparatus, and computer program product for determining an amount of storage for a level of detail in a MIP map. It includes identifying a given level of detail; identifying a size for an immediately larger level of detail and a magnitude for each dimension of the immediately larger level of detail; and calculating the amount of storage based on the size and magnitudes without using a multiply operation.

Particular implementations can include one or more of the following features. Calculating includes scaling the size. Scaling includes dividing each of the magnitudes by two and discarding any remainders; and dividing the size by $2^n$ and discarding any remainder, where n is the number of non-zero magnitudes remaining after dividing each of the magnitudes; wherein the size after dividing the size is the amount of storage for the given level of detail. It includes adding one to the amount of storage when any of the n least significant bits of the size of the immediately larger level of detail is non-zero. Dividing each of the magnitudes includes shifting the binary value of the magnitude to the right by one bit. Dividing the size includes shifting the binary value of the size to the right by n nits. A storage alignment restriction requires the starting address for each level of detail to be a multiple of m pixels from a predetermined address, and identifying a size and magnitudes includes identifying the size and magnitudes in units such that each unit contains m pixels.

Advantages that can be seen in implementations of the invention include one or more of the following. Implementations of the present invention avoid the use of a multiply operation at run time. In addition, implementations of the present invention do not require an array of pointers. This feature eliminates the memory required to store the array of pointers, and the time required to use such an array at run time.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
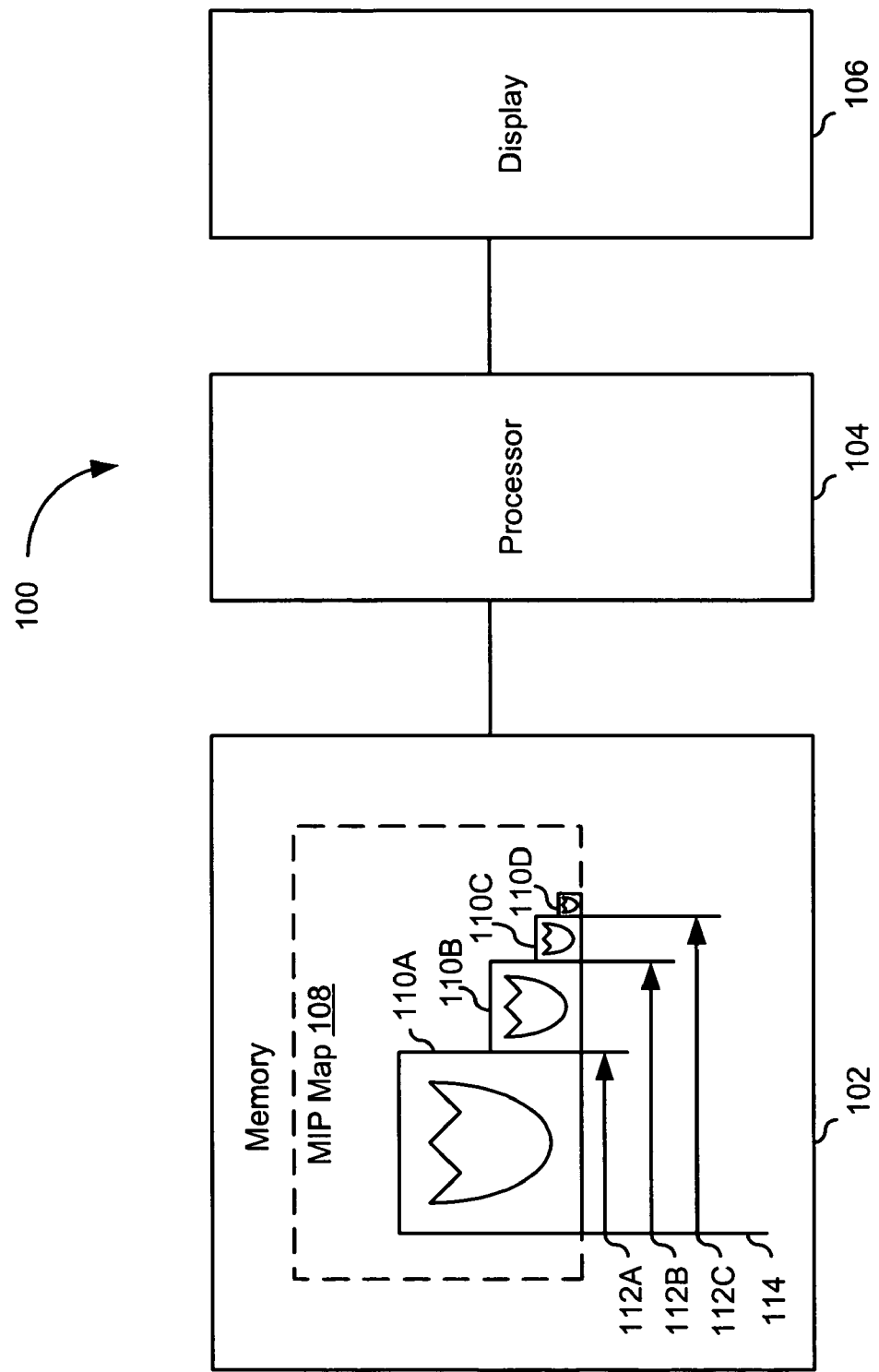
FIG. 1 is a block diagram of a graphics system with which the present invention is useful.

FIG. 1 is a block diagram of a graphics system 100 with which the present invention is useful. System 100 includes a memory 102, a processor 104, and a display 106. Processor 104 manipulates data stored in memory 102 to produce images that can be viewed by humans on display 106. The data stored in memory 102 includes a MIP map 108 for an image of a tulip that includes four levels of detail (LOD) 110. Each LOD 110 is stored sequentially in memory at a location defined by an offset 112 from a base address 114.

Referring to FIG. 1, the offsets for LODs 112A, 112B, 112C, 112D are zero, offset 110A, offset 110B, and offset 110C, respectively.

Figure 2:
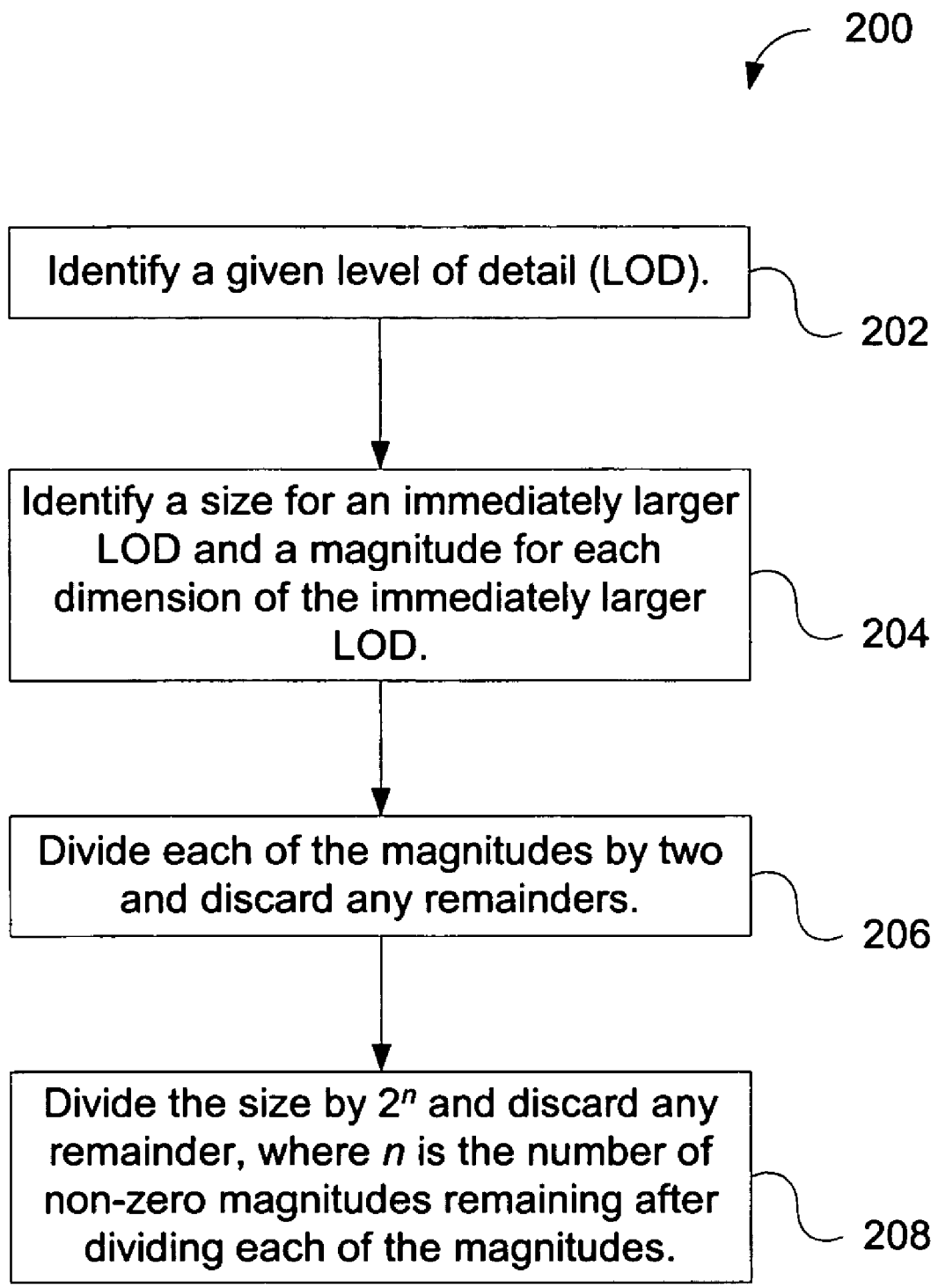
FIG. 2 is a flowchart depicting a process for determining an amount of storage for a LOD in a MIP map according to an implementation of the present invention.

FIG. 2 is a flowchart depicting a process 200 for determining an amount of storage for a LOD in a MIP map according to an implementation of the present invention. Process 200 begins by identifying a given LOD (step 202). For example, the number of the given LOD can be passed to process 200 by a calling process. Process 200 then identifies a size for an immediately larger LOD and a magnitude for each dimension of the immediately larger LOD (step 204). As used herein, a LOD having a large number of pixels is considered larger than a LOD having a smaller number of pixels. Also as used herein, a LOD having a small number of pixels is considered smaller than a LOD having a larger number of pixels. A first LOD is considered immediately larger than a second LOD when the first LOD is larger than the second LOD and no LOD is both smaller than the first LOD and larger than the second LOD.

Each LOD has two or more dimensions. For example, the dimensions of a three-dimensional image could be width, height, and depth. Each dimension has a magnitude. Each LOD also has a size. The size of a LOD can be calculated in numerous ways. The size of the largest LOD in a MIP map is usually calculated by taking the product of the magnitudes of each dimension of that LOD. In one implementation, the size of any other LOD in the MIP map is calculated by scaling the size of the immediately larger LOD, as described in detail below.

Process 200 divides each of the magnitudes by two and discards any remainders (step 206). In one implementation, each magnitude is divided by two by right-shifting a binary representation of the magnitude. The results are the magnitudes of the dimensions of the given LOD.

Process 200 divides the size by $2^n$ and discards any remainder, where n is the number of non-zero magnitudes remaining after dividing the magnitudes of the immediately larger LOD (step 208). Of course no LOD has a dimension of magnitude zero. A magnitude of zero in process 200 represents a magnitude of one in the actual MIP map. The result is used as the amount of storage for the given LOD.

One advantage of this technique is that it avoids the use of a multiply operation at run time. This technique also does not require an array of pointers. This feature eliminates the memory required to store the array of pointers, and the time required to use such an array at run time.

Figure 3:
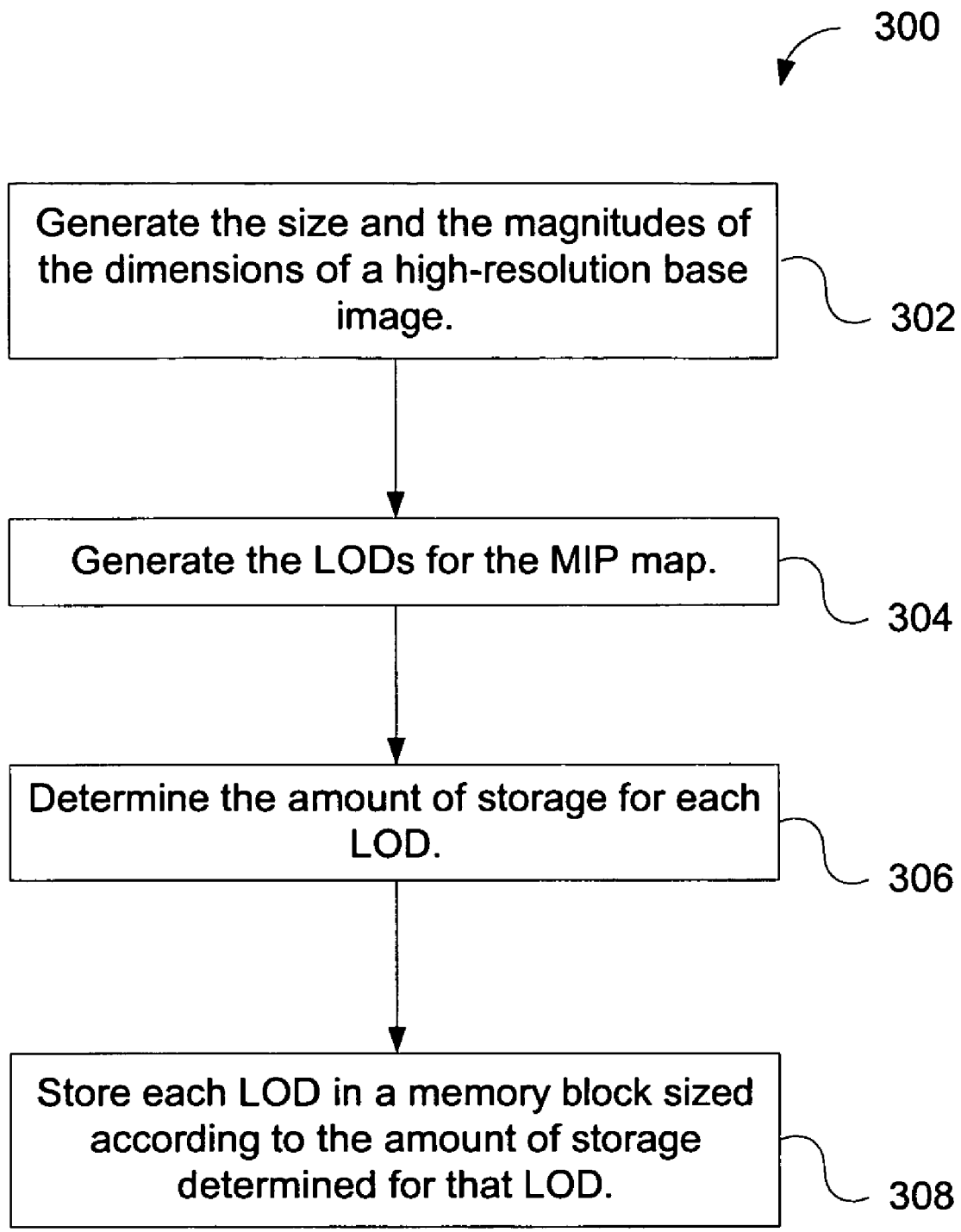
FIG. 3 is a flowchart depicting a process for generating a MIP map according to an implementation of the present invention.

FIG. 3 is a flowchart depicting a process 300 for generating a MIP map according to an implementation of the present invention. Process 300 first generates the size and the magnitudes of the dimensions of a high-resolution base image (step 302). If the size of the base image is not known, it can be calculated by taking the product of its magnitudes.

Process 300 generates the LODs for the MIP map (step 304). The base image forms the largest LOD, referred to herein as LOD zero ("0"). Each of the remaining LODs are generated by subsampling the base image in each dimension by a factor of two.

Process 300 determines the amount of storage for each LOD (step 306). In one implementation, process 300 calls process 200, which executes recursively to generate an amount of storage for each LOD.

Next process 300 stores each LOD in a memory block sized according to the amount of storage determined for that LOD (step 308). In one implementation the memory blocks are arranged sequentially, starting with the largest LOD.

Then at run time the base address of a given LOD can be quickly determined by adding the storage amounts of the larger LODs.

The amount of storage determined for a LOD by process 200 generally exceeds the actual storage requirements for that LOD, resulting in a small amount of unused storage space. However, the benefit of improvement in run-time efficiency over conventional processes far exceeds any detriment of a small amount of unused storage space. A LOD can be stored at the beginning of its memory block, at the end of its memory block, or anywhere in between.

In another implementation, process 200 is used to locate a given LOD within the MIP map at run time. A calling process calls process 200 and passes to process 200 the size and the magnitudes of the dimensions of a LOD that is immediately larger than the given LOD. Process 200 executes as described above to calculate the amount of storage required by, and the magnitudes of each dimension of, the given LOD and passes this amount of storage and magnitudes to the calling process. In one implementation, the calling process determined the size and magnitudes of the immediately larger LOD by previously calling process 200 and using the amount of storage previously returned by process 200 as the size. In another implementation, the calling process determined the size of the immediately larger LOD by taking the product of its magnitudes.

Figure 4A:
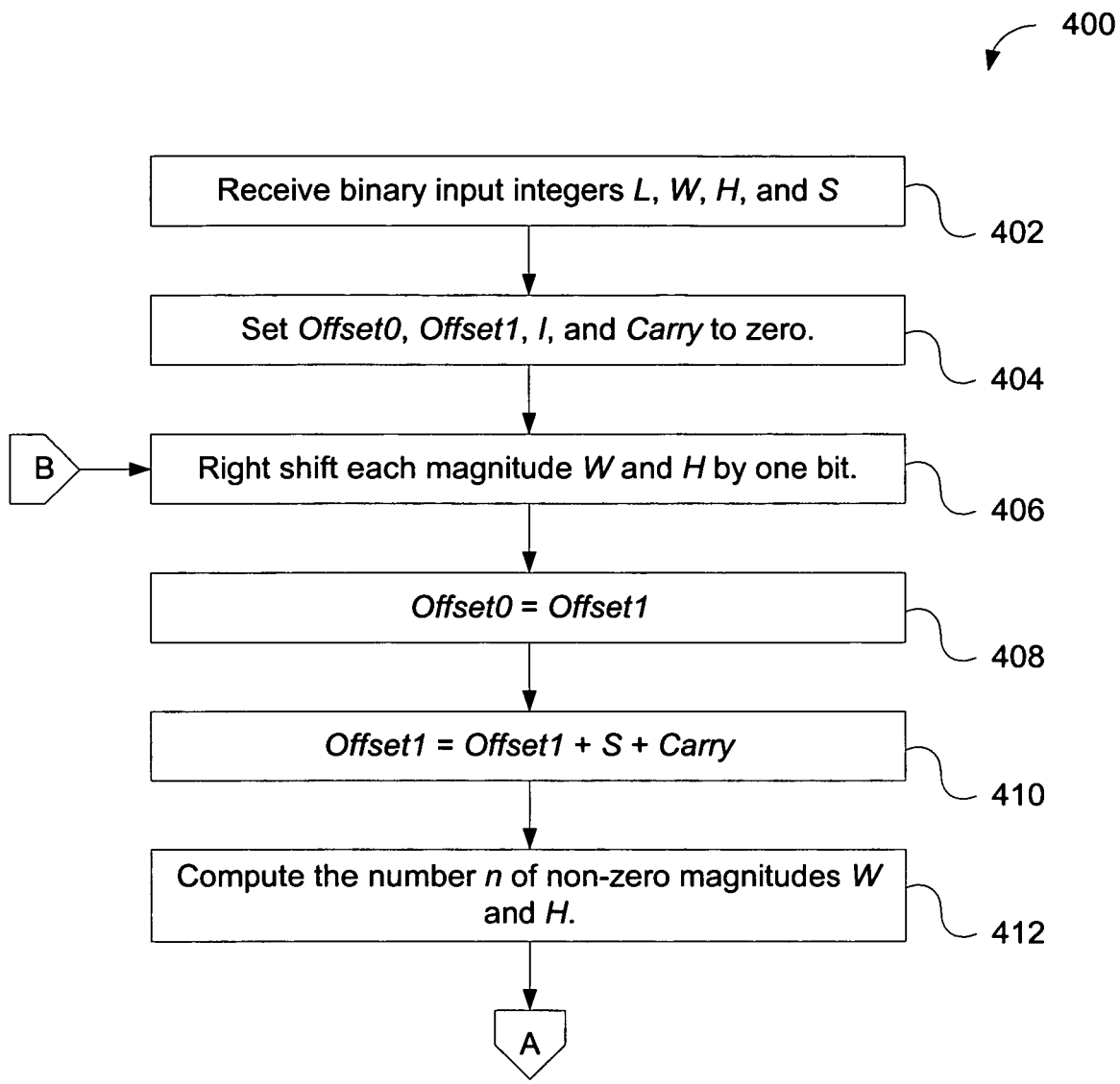
FIG. 4 is a flowchart depicting a process for determining an amount of storage for a LOD in a MIP map for a two-dimensional image given a base image according to an implementation of the present invention.
Figure 4B:
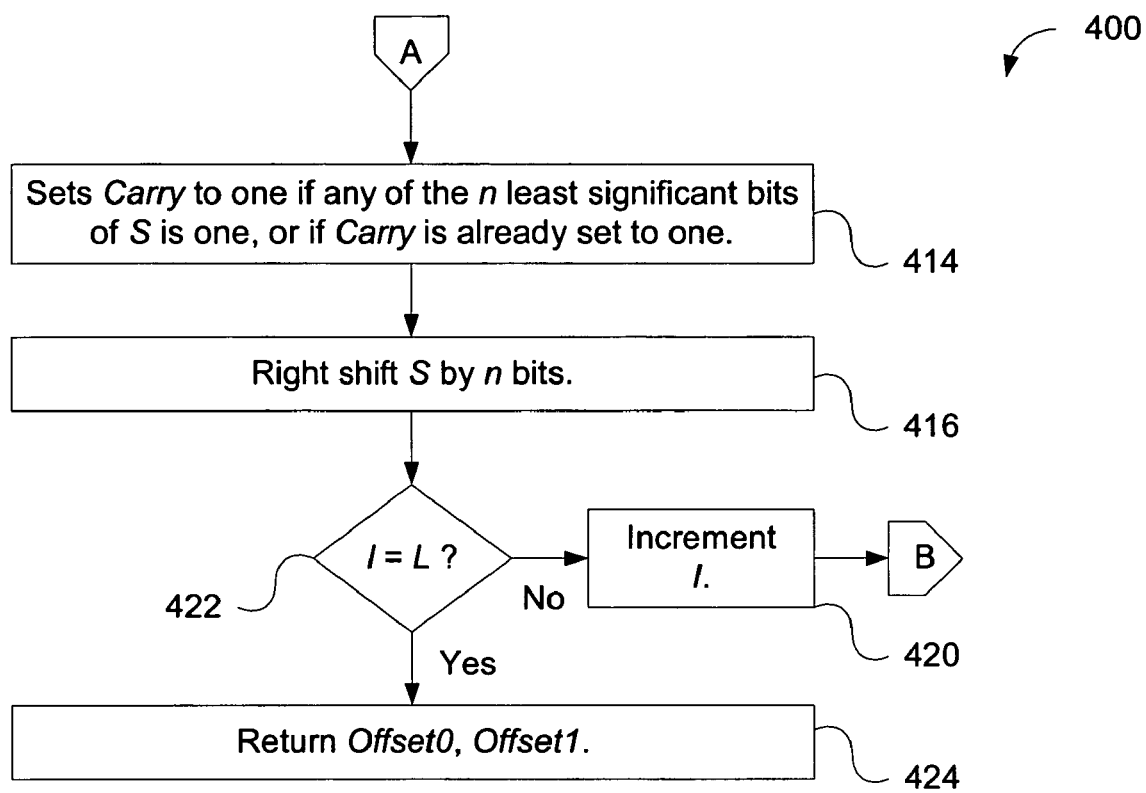

FIG. 4 is a flowchart depicting a process 400 for determining an amount of storage for a LOD in a MIP map for a two-dimensional image given a base image according to an implementation of the present invention. Methods for extending process 400 to images having more than two dimensions will be apparent to one skilled in the relevant art after reading this description.

Process 400 first receives binary input integers L, W, H, and S (step 402). L is the number of the LOD for which an amount of storage is requested. W and H are the magnitudes of the width and height dimensions, respectively, of the base image of the MIP map. Recall that the LOD number of the base image is zero ("0"). S is the size of the base image, which may be calculated by taking the product of the magnitudes of the dimensions of the base image.

Process 400 then initializes binary process variables Offset0, Offset1, I, and Carry by setting them to zero (step 404). Process 400 then right shifts each magnitude W and H by one bit (step 406). This step has the effect of dividing W and H by two and discarding any remainders. Process 400 then assigns the value of Offset1 to Offset0 (step 408). Process 400 then assigns to Offset1 the sum of Offset1, S, and C (step 410). Process 400 then computes the number n of non-zero magnitudes W and H (step 412). Process 400 sets Carry to one if any of the n least significant bits of S is one, or if Carry is already set to one (step 414). Process 400 then right shifts S by n bits (step 416). This step has the effect of dividing S by $2^n$ and discarding any remainder.

If I≠ L (step 422), then process 400 increments I (step 420), and resumes at step 406. When I=L, (step 422), process 400 returns the values of Offset1 and Offset0, which give the beginning and end offsets, respectively, of the memory block for the requested LOD (step 424). Each offset is a distance in memory from the beginning address of the base image (referred to herein as the "base address"). The end offset for one LOD is the beginning offset for the next. Thus, process 400 returns the beginning offsets for two sequential LODs. In one implementation an interpolation is performed between two sequential LODs of an image to achieve a desired level of detail for the image.

Table 1 shows the values of the variables generated by process 400 (at step 406 or step 424) for each of the LODs given a base image having a width W=63 and a height H=7. For example, referring to Table 1, the memory block for LOD 3 (L=3) has a beginning offset of 552 and an ending offset of 580. Process magnitudes of zero are shown in Table 1 as "1 (0)" to indicate that a process magnitude of zero represents a magnitude of one within the actual MIP map. Variable values of "X" indicate a "don't care" condition.

TABLE 1

| I | W | H | S | Offset0 | Offset1 | Carry | n |
|---|---|---|---|---------|---------|-------|---|
| 0 | 63 | 7 | 441 | 0 | 0 | 0 | X |
| 1 | 31 | 3 | 110 | 0 | 441 | 1 | 2 |
| 2 | 15 | 1 | 27 | 441 | 552 | 1 | 2 |
| 3 | 7 | 1 (0) | 13 | 552 | 580 | 1 | 1 |
| 4 | 3 | 1 (0) | 6 | 580 | 594 | 1 | 1 |
| 5 | 1 (0) | 1 (0) | 3 | 594 | 601 | X | X |

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. For example, some computer graphics systems impose a storage alignment restriction that requires the starting address for each level of detail to be a multiple of m bytes from a predetermined address. Implementations of the invention are easily modified to accommodate such restrictions by measuring the size and magnitudes of each LOD in units such that each unit contains m bytes, for example, by rounding up the size and magnitudes of the dimensions of the base image to the next larger multiple of m bytes. Accordingly, other embodiments are within the scope of the following claims.

What is claimed is:

1. A method for determining an amount of storage for a level of detail other than the base image in a MIP map, comprising:
   identifying a first level of detail other than the base image;
   identifying a size for an immediately larger level of detail and a magnitude for each dimension of the immediately larger level of detail; and
   calculating the amount of storage to be used for storing the first level of detail based on the size and magnitudes without using a multiply operation.

2. The method of claim 1, wherein calculating comprises:
   scaling the size.

3. The method of claim 2, wherein scaling comprises:
   dividing each of the magnitudes by two and discarding any remainders; and
   dividing the size by $2^n$ and discarding any remainder, where n is the number of non-zero magnitudes remaining after dividing each of the magnitudes;
   wherein the size after dividing the size is the amount of storage for the first level of detail.

4. The method of claim 3, further comprising:
   adding one to the amount of storage when any of the n least significant bits of the size of the immediately larger level of detail is non-zero.

5. The method of claim 3, wherein dividing each of the magnitudes comprises:
   shifting the binary value of the magnitude to the right by one bit.

6. The method of claim 3, wherein dividing the size comprises:
   shifting the binary value of the size to the right by n bits.

7. The method of claim 1, wherein a storage alignment restriction requires the starting address for each level of detail to be a multiple of m pixels from a predetermined address, wherein identifying a size and magnitudes comprises:
   identifying the size and magnitudes in units such that each unit contains m pixels.

8. An apparatus for determining an amount of storage for a level of detail other than the base image in a MIP map, comprising:
   means for identifying first level of detail exclusive of the base image;
   means for identifying a size for an immediately larger level of detail and a magnitude for each dimension of the immediately larger level of detail; and
   means for calculating the amount of storage to store the first level of detail based on the size and magnitudes without using a multiply operation.

9. The apparatus of claim 8, wherein means for calculating comprises:
   means for scaling the size.

10. The apparatus of claim 9, wherein means for scaling comprises:
    means for dividing each of the magnitudes by two and discarding any remainders; and
    means for dividing the size by $2^n$ and discarding any remainder, where n is the number of non-zero magnitudes remaining after dividing each of the magnitudes;
    wherein the size after dividing the size is the amount of storage for the first level of detail.

11. The apparatus of claim 10, further comprising:
means for adding one to the amount of storage when any of the n least significant bits of the size of the immediately larger level of detail is non-zero.

12. The apparatus of claim 10, wherein means for dividing each of the magnitudes comprises:
means for shifting the binary value of the magnitude to the right by one bit.

13. The apparatus of claim 10, wherein means for dividing the size comprises:
means for shifting the binary value of the size to the right by n bits.

14. The apparatus of claim 8, wherein a storage alignment restriction requires the starting address for each level of detail to be a multiple of m pixels from a predetermined address, wherein means for identifying a size and magnitudes comprises:
means for identifying the size and magnitudes in units such that each unit contains m pixels.

15. A computer program product, tangibly stored on a computer-readable medium, for determining an amount of storage for a level of detail other than the base image in a MIP map, comprising instructions operable to cause a programmable processor to:
identify a first level of detail other than the base image;
identify a size for an immediately larger level of detail and a magnitude for each dimension of the immediately larger level of detail; and
calculate the amount of storage to store the first level of detail based on the size and magnitudes without using a multiply operation.

16. The computer program product of claim 15, wherein instructions operable to cause a programmable processor to calculate comprise instructions operable to cause a programmable processor to:
scale the size.

17. The computer program product of claim 16, wherein instructions operable to cause a programmable processor to scale comprise instructions operable to cause a programmable processor to:
divide each of the magnitudes by two and discarding any remainders; and
divide the size by $2^n$ and discarding any remainder, where n is the number of non-zero magnitudes remaining after dividing each of the magnitudes;
wherein the size after dividing the size is the amount of storage for the first level of detail.

18. The computer program product of claim 17, further comprising instructions operable to cause a programmable processor to:
add one to the amount of storage when any of the n least significant bits of the size of the immediately larger level of detail is non-zero.

19. The computer program product of claim 17, wherein instructions operable to cause a programmable processor to divide each of the magnitudes comprise instructions operable to cause a programmable processor to:
shift the binary value of the magnitude to the right by one bit.

20. The computer program product of claim 17, wherein instructions operable to cause a programmable processor to divide the size comprises:
shift the binary value of the size to the right by n bits.

21. The computer program product of claim 15, wherein a storage alignment restriction requires the starting address for each level of detail to be a multiple of m pixels from a predetermined address, wherein instructions operable to cause a programmable processor to identify a size and magnitudes comprise instructions operable to cause a programmable processor to:
identify the size and magnitudes in units such that each unit contains m pixels.

* * * * *